(12) United States Patent
Holness et al.

(10) Patent No.: US 8,737,198 B1
(45) Date of Patent: May 27, 2014

(54) METHOD AND APPARATUS FOR CONTROLLING A SET OF ETHERNET NODES INTERCONNECTED TO FORM ONE OR MORE CLOSED LOOPS

(75) Inventors: Marc Holness, Nepean (CA); Donald Ellis, Ottawa (CA); Nicola Benvenuti, Kanata (CA)

(73) Assignee: Ciena Corporation, Hanover, MD (US)

( * ) Notice: Subject to any disclaimer, the term of this patent is extended or adjusted under 35 U.S.C. 154(b) by 269 days.

(21) Appl. No.: 12/027,942

(22) Filed: Feb. 7, 2008

Related U.S. Application Data

(60) Provisional application No. 60/888,646, filed on Feb. 7, 2007, provisional application No. 61/009,629, filed on Dec. 31, 2007, provisional application No. 61/009,720, filed on Dec. 31, 2007.

(51) Int. Cl.
*G01R 31/08* (2006.01)

(52) U.S. Cl.
USPC .......................................................... 370/222

(58) Field of Classification Search
USPC ......... 370/216–218, 222–225, 254, 258, 241, 370/241.1, 242–5
See application file for complete search history.

(56) References Cited

U.S. PATENT DOCUMENTS

| | | | |
|---|---|---|---|
| 7,003,705 B1 * | 2/2006 | Yip et al. ....................... | 714/717 |
| 7,185,077 B1 * | 2/2007 | O'Toole et al. ............... | 709/223 |
| 7,599,315 B2 * | 10/2009 | Cornet et al. ................. | 370/258 |
| 7,606,240 B1 * | 10/2009 | Shah ............................ | 370/400 |
| 2003/0043738 A1 * | 3/2003 | Barsheshet .................. | 370/222 |
| 2004/0114520 A1 * | 6/2004 | Davis .......................... | 370/236.1 |
| 2006/0109802 A1 * | 5/2006 | Zelig et al. ................... | 370/258 |
| 2007/0025256 A1 * | 2/2007 | Hertoghs et al. ........... | 370/236.2 |
| 2007/0165517 A1 * | 7/2007 | Binetti et al. ................ | 370/222 |
| 2007/0189154 A1 * | 8/2007 | Hourtane et al. ............ | 370/218 |
| 2009/0141656 A1 * | 6/2009 | Fan et al. ..................... | 370/254 |

* cited by examiner

*Primary Examiner* — Mark Rinehart
*Assistant Examiner* — Peter Cheng
(74) *Attorney, Agent, or Firm* — Muncy, Geissler, Olds & Lowe, P.C.

(57) ABSTRACT

Ethernet nodes, interconnected logically or physically to construct a closed loop, may be controlled using a control protocol that governs placement of blocks on the ring. The control protocol allows one of the nodes to be designated as a root node in normal operation. The root node will block data traffic on one of its ports on the ring to prevent a forwarding loop from being created on the ring. Each node on the ring performs link level connectivity detection and, upon detection of a failure, will send out a Failure Indication Message (FIM). When a node receives a FIM, it will flush its forwarding database associated with the ring and, if it is the root node, will remove the data block on the port. When the failure recovers, the nodes adjacent the failure will transmit a recovery indication message to allow the ring to revert to its normal state.

25 Claims, 14 Drawing Sheets

Figure 18

| 1 Node State | 2 Link State | 3 Port State | 4 New Link State | 5 Rx | Row | 6 Action | 7 New Node State |
|---|---|---|---|---|---|---|---|
| Normal | LOC | | LOC | | 1 | | |
| | | | OK | | 2 | | |
| | OK | Block | LOC | | 3 | Flush FDB; Tx: ETH-FIM | Protect |
| | | | OK | ETH-FIM | 4 | Flush FDB; Unblock Port | |
| | | | | ETH-RIM | 5 | Flush FDB | Normal |
| | | | | | 6 | | |
| | | Un block | LOC | | 7 | Block port; Flush FDB; Tx ETH-FIM | Protect |
| | | | OK | ETH-FIM | 8 | Flush FDB | |
| | | | | ETH-RIM | 9 | Flush FDB | Normal |
| | | | | | 10 | | |
| Protect | LOC | | LOC | | 11 | | Protect |
| | | | OK | | 12 | Tx: ETH-RIM | Pending |
| | OK | Block | LOC | | 13 | Tx: ETH-FIM | Protect |
| | | | OK | ETH-FIM | 14 | | |
| | | | | My ETH-RIM | 15 | If not Root, unblock port; Flush FDB; Terminate Tx ETH-RIM | Normal |
| | | | | ETH-RIM | 16 | Flush FDB | Protect |
| | | | | | 17 | | |
| | | Un block | LOC | | 18 | Block port; Flush FDB; Tx ETH-FIM | Protect |
| | | | OK | ETH-FIM | 19 | | |
| | | | | ETH-RIM | 20 | Flush FDB; if Root, Block Port | Normal |
| | | | | | 21 | | Protect |
| Pending | LOC | | LOC | | 22 | | |
| | | | OK | | 23 | | |
| | OK | Block | LOC | | 24 | Tx: ETH-FIM | Protect |
| | | | OK | ETH-FIM | 25 | Flush FDB; Unblock port; Terminate TX Eth-RIM | |
| | | | | My ETH-RIM | 26 | If not Root, unblock port; Flush FDB; Terminate Tx ETH-RIM | Normal |
| | | | | ETH-RIM | 27 | Flush FDB | Pending |
| | | | | | 28 | | |
| | | Un block | LOC | | 29 | Block port; Flush FDB; Tx ETH-FIM | Protect |
| | | | OK | ETH-FIM | 30 | | |
| | | | | ETH-RIM | 31 | Flush FDB; if Root, Block Port | Normal |
| | | | | | 32 | | Protect |

LOC=Loss of Connectivity
ETH-FIM= Ethernet Failure Indication Message
ETH-RIM= Ethernet Restore Indication Message
FDB = Filter DataBase

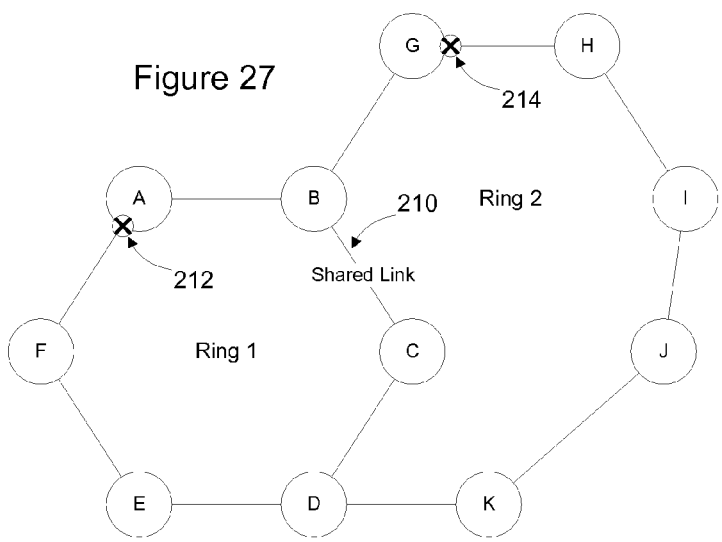
Figure 27
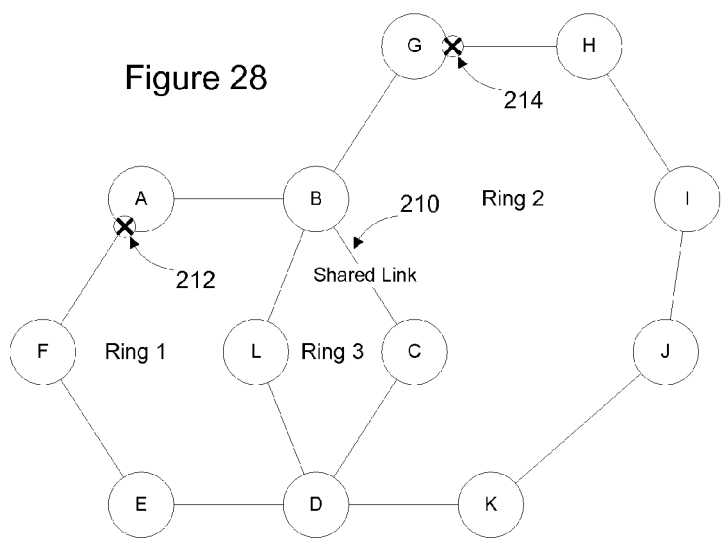
Figure 28
Figure 29
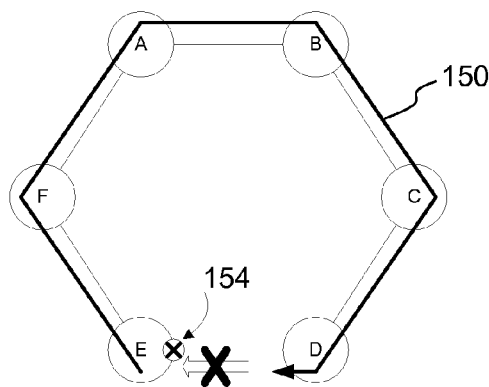

METHOD AND APPARATUS FOR CONTROLLING A SET OF ETHERNET NODES INTERCONNECTED TO FORM ONE OR MORE CLOSED LOOPS

CROSS-REFERENCE TO RELATED APPLICATIONS

This application claims priority to U.S. Patent Application No. 60/888,646, entitled Ethernet Shared Protection Ring, filed Feb. 7, 2007, the content of which is hereby incorporated herein by reference. This application is also related to U.S. Provisional Patent Application No. 61/009,629, entitled Interworking An Ethernet Ring Network With a Spanning Tree Controlled Ethernet Network, filed Dec. 31, 2007, and to U.S. Provisional Patent Application No. 61/009,720, entitled Interworking An Ethernet Ring Network With an Ethernet Network with Traffic Engineered Paths, filed Dec. 31, 2007, the content of each of which is hereby incorporated herein by reference.

TECHNICAL FIELD

The present invention relates to Ethernet networks and, more particularly, to a method and apparatus for controlling a set of Ethernet nodes interconnected to form one or more closed loops.

BACKGROUND

Data communication networks may include various computers, servers, nodes, routers, switches, bridges, hubs, proxies, and other network devices coupled to and configured to pass data to one another. These devices will be referred to herein as "network elements." Data is communicated through the data communication network by passing protocol data units, such as Internet Protocol packets, Ethernet frames, data cells, segments, or other logical associations of bits/bytes of data, between the network elements by utilizing one or more communication links between the network elements. A particular protocol data unit may be handled by multiple network elements and cross multiple communication links as it travels between its source and its destination over the network.

The various network elements on the communication network communicate with each other using predefined sets of rules, referred to herein as protocols. Different protocols are used to govern different aspects of the communication, such as how signals should be formed for transmission between network elements, various aspects of what the protocol data units should look like, how protocol data units should be handled or routed through the network by the network elements, and how information associated with routing information should be exchanged between the network elements.

The Institute of Electrical and Electronics Engineers (IEEE) defines a suite of Ethernet protocols. Conventionally, Ethernet has been used to implement networks in enterprises such as businesses and campuses, and other technologies have been used to transport network traffic over longer distances. Many extensions to the original standard have been proposed, such as 802.1Q, 802.1ad, and 802.1ah, which allow additional fields to be added to the basic Ethernet frame. As the Ethernet standard has evolved, Ethernet has become more viable as a long distance transport technology.

The original Ethernet standard and most of the extensions, such as 802.1D, 802.1Q, 802.1ad, and 802.1ah, all use a spanning tree in the control plane to determine which links should be active and which should be blocked to prevent the formation of loops. Other standards, such as 802.1Qay implement traffic engineered paths through the network which are explicitly defined routes through the network. Still other extensions to the original standard implement a link state protocol to control how Ethernet frames are forwarded through the network. One goal of all these control protocols is to select links to be used to forward traffic, and block other links, to prevent the formation of loops on the network.

Network nodes may be logically or physically arranged many different ways. One common way to arrange or interconnect network elements is to interconnect them in a ring, for example as shown in FIG. 1. In the example shown in FIG. 1, the ring 10 includes nodes 12, which are interconnected by links 14. In the example shown in FIG. 1, each node has a pair of 802.3 MAC interfaces 16 and an 802.1 bridge relay 18. The bridge relay may use any one of the various Ethernet standards or extensions mentioned above. A control entity 20 is used to allow the network elements to exchange routing information and other control information, and is used by the network element to control how the data plane handles the data on the network. For example, in a network implementing a spanning tree, the control entity would control which ports of the Ethernet node were active and which were blocked.

One common network topology is to interconnect network elements in a physical or logical ring. A ring will also be referred to herein as a closed loop. An advantage of implementing the network as a closed loop is that traffic may be forwarded in either direction around the closed loop. This allows rapid protection switching to occur upon failure of a node or link on the ring.

Although ring networks have this advantage, when the network used to implement the closed loop is based on one of the Ethernet standards, the control protocol being used to control forwarding on the closed loop must control forwarding on the ring to prevent a loop from being formed in the network. Specifically, when a loop is formed on an Ethernet network the traffic may propagate endlessly around the loop since each Ethernet node will continue to bridge the traffic endlessly around the closed loop.

As mentioned above, many of the Ethernet networks use a spanning tree to control which links on the network are active and which are not. Although spanning tree may be used to control a network of Ethernet nodes forming a closed loop, spanning tree is a generalized control protocol that was developed to be used in a multiply connected network such as a mesh network. Thus, it would be advantageous to have a new control protocol that is more optimized to be used in connection with a set of Ethernet nodes interconnected to form one or more closed loops.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

FIG. 18 is a state machine diagram implemented by nodes of a closed loop of Ethernet nodes to allow the nodes to respond to a failure and recover from a failure as shown in FIGS. 16 and 17, respectively;

FIGS. 27 and 28 are functional block diagrams showing additional interconnection possibilities between closed loops of Ethernet nodes using logical shared links; and FIG. 29 is a functional block diagram showing a unidirectional failure on a closed loop of Ethernet nodes.

DETAILED DESCRIPTION

IEEE 802.1 Q/D, IEEE 802.1ad (Q-in-Q or Provider Bridging), IEEE 802.1ah (MAC-in-MAC or Provider Backbone Bridging), IEEE 802.1Qay (PBB-TE or Provider Backbone Bridging-Traffic Engineering), MPLS/IP, and other protocols have been developed to specify how data should be forwarded in an Ethernet network. These protocols specify how data should be handled by the nodes on the Ethernet network. A separate control protocol is used to specify how the nodes should forward data, i.e. which ports should be used to forward frames and which ports should be blocked. The method and apparatus described herein can be used to control a set of Ethernet nodes configured to operate using any one of these underlying transport protocols. Specifically, since the method and apparatus described herein are used to control the forwarding state of the various nodes, it may be used by the set of nodes regardless of the particular technology used in the data plane to forward traffic on the network. Thus, the control protocol described herein is agnostic as to the underlaying transport protocol being used to forward data on the network.

Similarly, the control protocol described herein is agnostic to other control protocols being implemented on the network. For example, the closed loop control protocol may operate independently of lower layer control protocols, such as simple link layer protection protocols (i.e. link layer 1+1, 1:1 (802.3ad) or 1:N). Additionally, the closed loop control protocol may exist below a network layer control protocol and is thus agnostic as to the type of control protocol being implemented at the network layer. Thus, the control protocol can operate below other network layer protocols such as network layer spanning tree, RSTP, and MPLS. Accordingly, the control protocol for the closed loop operates between the Ethernet link and Ethernet network layers, and is independent of and agnostic to the types of protocols being implemented in each of these layers.

Network elements on a closed loop network topology will be referred to herein as Ethernet Shared Protection Ring (E-SPRing) nodes. The control protocol described herein will be referred to as E-SPRing. The invention is not limited by these particular labels that have been assigned to the protocol and to the nodes engaging in the protocol, as other names may be assigned while allowing the nodes and network to function as described in greater detail herein. Thus, the invention is not limited to an embodiment that is referred to as E-SPRing. For example, elsewhere the same functionality may be referred to as Packet Bridged Ring (PBR). Thus, different names may be used to refer to similar functionality and, although a particular set of terms has been selected to describe the several embodiments, the invention is not intended to be limited by this particular selection of nomenclature.

Figure 1:
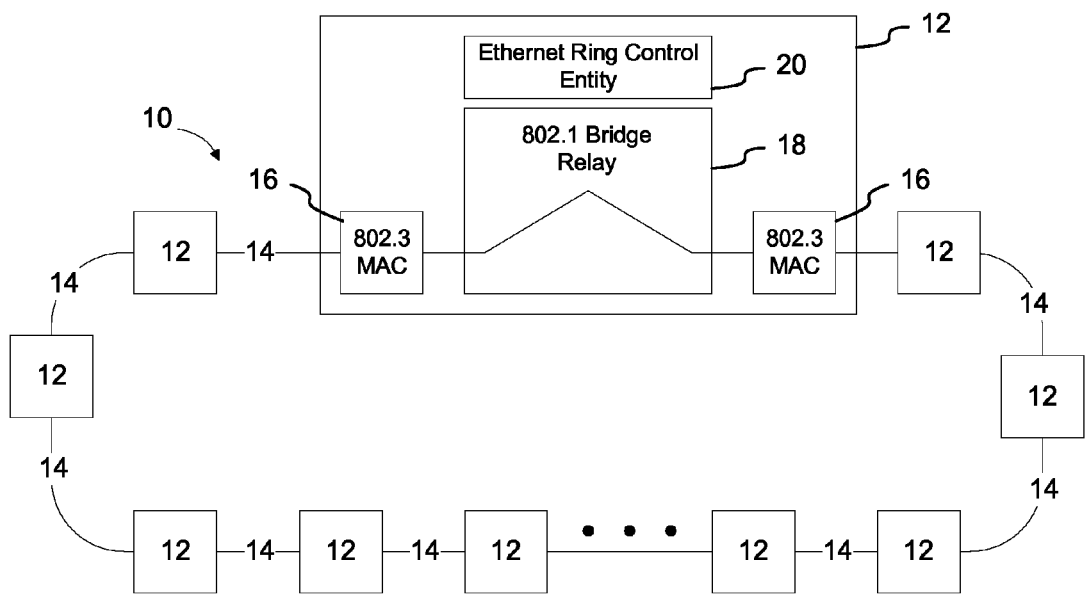
FIG. 1 is a functional block diagram of an example set of Ethernet nodes interconnected to form a closed loop.
Figure 2:
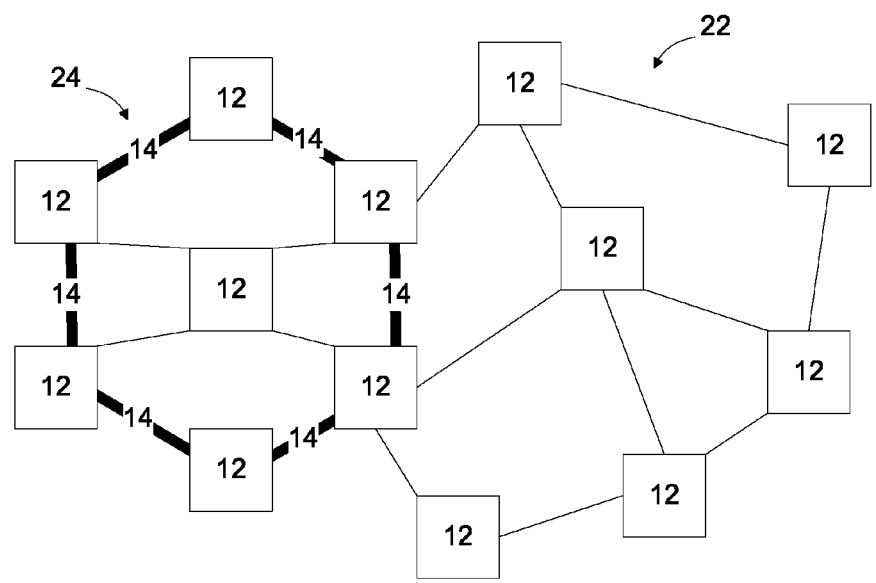
FIG. 2 is a functional block diagram of an example mesh network in which a logical association of Ethernet nodes has been designated to form a logical closed loop.

Closed loops such as the loop shown in FIG. 1 may exist in isolation or may exist as a logical ring within a larger mesh network. The control protocol may be used wherever a set of Ethernet nodes is interconnected logically or physically to construct a closed loop network topology. FIG. 2 shows an example of a communication network having a mesh configuration. A mesh configuration exists where multiple nodes are interconnected with multiple other adjacent nodes. As shown in FIG. 2, it is possible to form a logical ring by selecting nodes 12 from the mesh 22 that interconnect to form a closed loop 24 network topology. The closed loop in FIG. 2 is illustrated in dark links 14. An Ethernet Shared Protection Ring (E-SPRing) control instance may be run on the logical ring 24, as described in greater detail below.

The physical bandwidth on the link 14 on a given closed loop need not be homogeneous. That is, individual ring spans may have greater physical bandwidths than others. This allows the network operator to use techniques such as link aggregation to increase the bandwidth of individual server layer links. Alternatively, one ring span could be governed by a server layer that utilizes a 10 GbE physical link, while another could be supported by a server layer that utilizes a link aggregated (e.g., 8×1 GbE) set of links. This allows the network operator to grow the ring as the network evolves.

Figure 3:
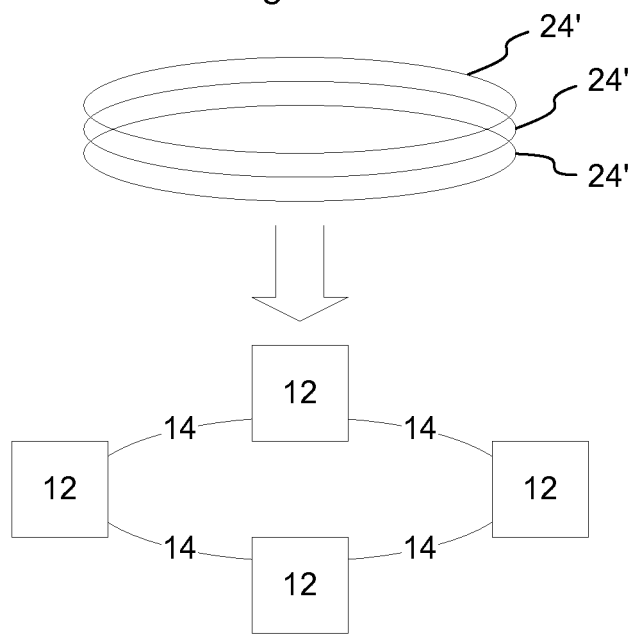
FIG. 3 is a functional block diagram showing multiple ringlets superimposed on a given physical closed loop.

FIG. 3 shows an example of how multiple independent ringlets 24' may be associated with a set of physical links in a ring topology. Each of the ringlets may be controlled using its own E-SPRing control instance. Thus, multiple control instances may exist on the same set of nodes implementing the same physical topology that forms the closed loop. For convenience, the manner in which a single control instance operates on a set of nodes forming a closed loop will be considered without considering the rest of the network or other similarly instantiated control instances. Since each control instance operates independent of the other control instances, where multiple ringlets are to be implemented on a given set of nodes, these additional control instances may be implemented in a similar manner.

Figure 4:
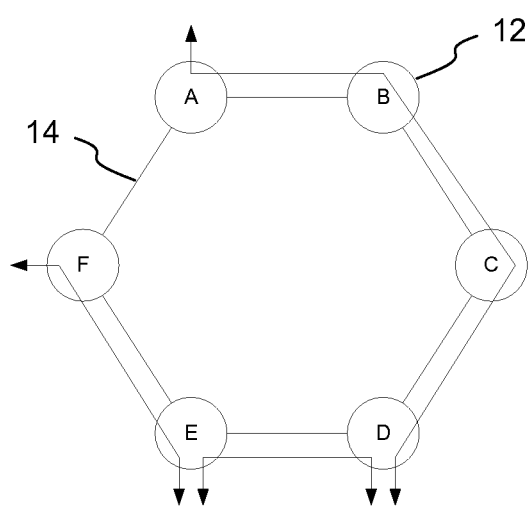
FIG. 4 is a functional block diagram of a closed loop showing peered connectivity between nodes on the closed loop.

There are two common ways of controlling traffic—peered connectivity mode in which each site is allowed to talk to all other sites, and hub-and-spoke connectivity mode in which sites are allowed to talk to the hub, but the sites are not allowed to talk directly with each other. The E-SPRing control protocol allows both types of connectivity. FIG. 4 shows an example of peered connectivity on a closed loop topology. As shown in FIG. 4, with peered connectivity each node can talk to each other node on the closed loop. Thus, for example, node E can talk directly with node F or with node D. Similarly, node D may exchange data directly with node A. Applications that could utilize this type of connectivity mode include Virtual Private Networks, Transparent LAN Services, POP Interconnect, Backhaul, Video on Demand, etc., although other types of applications may similarly use this type of connectivity.

Figure 5:
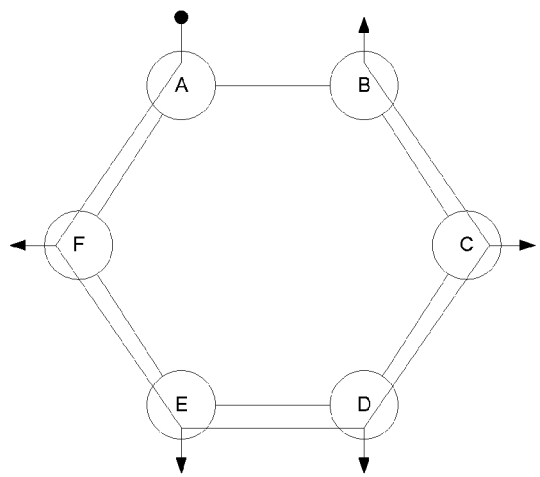
FIG. 5 is a functional block diagram of a closed loop showing interconnectivity from a hub node to spoke nodes.
Figure 6:
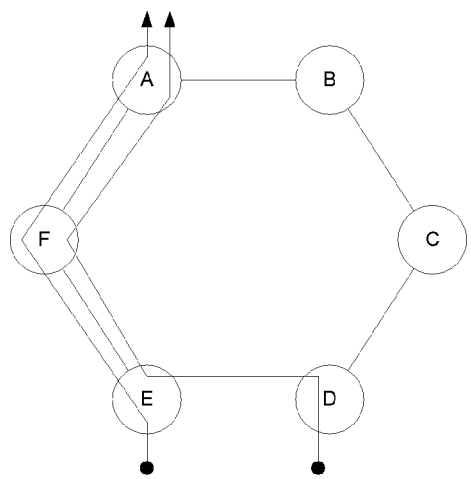
FIG. 6 is a functional block diagram of a closed loop showing interconnectivity from the spoke nodes to the hub node.

Hub and Spoke connectivity allows a designed (Hub) E-SPRing node to communicate to all other E-SPRing nodes on the closed loop, while the other E-SPRing nodes (i.e., Spoke nodes) can only communicate with the Hub E-SPRing node. Applications that could utilize this connectivity mode include: Internet Access, Video Distribution, and other applications where it is desirable for one node to control communications between the other nodes, although other types of applications may similarly use this type of connectivity. For example, as illustrated in FIG. 5, E-SPRing node A can directly communicate with nodes {B, C, D, E, F}. As shown in FIG. 6, however, E-SPRing nodes {B, C, D, E, F} can only directly communicate with node A.

Figure 7:
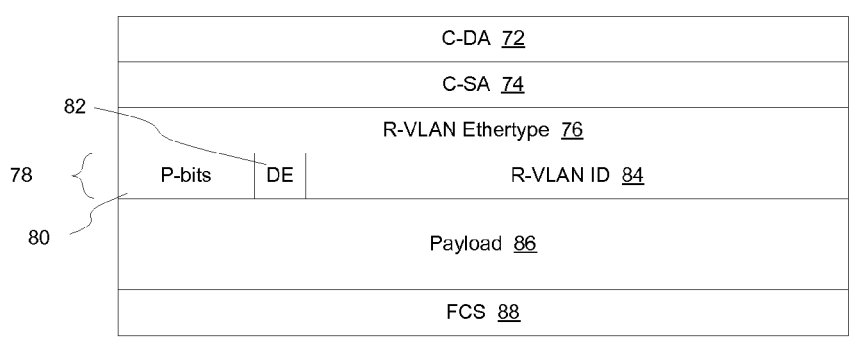
FIG. 7 is a functional block diagram of a data frame that may be transmitted on a set of Ethernet nodes interconnected to form a closed loop.

FIG. 7 shows the frame structure of an example frame that may be used on a ring. As shown in FIG. 7, E-SPRing complies with standard IEEE 802.1Q. Where other underlying transport mechanisms are in use, other frame formats may be used to allow the E-SPRing data format to comply with the underlying network transport protocol. E-SPRing can be configured to transport client traffic on ringlets or natively over the ring.

As shown in FIG. 7, the data frame includes a destination MAC address 72, and a source MAC address 74. The source and destination MAC addresses in FIG. 7 were shown as being customer MAC addresses. Where the underlying network is implemented using 802.1ah, the MAC addresses may instead be provider MAC addresses (B-DA, B-SA). Still alternatively, these MAC addresses may be specific to the ring such that the ingress node to the ring will perform 802.1 ah encapsulation to add the ingress node MAC address as the source MAC address 74 and the egress node MAC address as the destination MAC address 72.

When E-SPRing is configured in "transport" mode, the ingress node to the Ethernet ring will add a R-VLAN Ethertype and add an ringlet VLAN ID (R-VID) 78. The R-VID in one embodiment, has the format of a C-VID specified in 802.1Q or S-VID specified in 802.1ad. Specifically, the R-VID includes three p-bits 80 specified by 802.1p that may be used to specify a class of service for the frame and a DE bit 82 that may be used for traffic management on the ring. The R-VID further includes a R-VLAN tag 84. The R-VLAN tag 84 identifies the frame as either a management frame or a data frame. If the frame is a data frame, the R-VLAN tag 84 further identifies the ringlet with which the frame is associated. Multiple different R-VLAN tags may be used where multiple ringlets are being implemented on the Ethernet ring. Similarly, more than one R-VLAN tag may be used for a given ringlet, for example where the ringlet is to implement hub-and-spoke connectivity. When E-SPRing is configured in "native" mode, the client VLAN tag is used as the ring VLAN tag over the ring. In this mode, no additional VLAN insertion is required.

The frame will also include a payload 86 and FCS field 88. The payload 86 may include the native encapsulated frame so that the native frame may be recovered upon egress from the Ethernet ring network.

Client frames requesting transport over the ring via an E-SPRing ringlet will have an R-VLAN tag inserted. The R-VLAN tag allows traffic on different ringlets to be handled differently by the nodes on the ring, so that for example different root nodes may be selected for different ringlets. The ringlet VLAN tag will be removed before the client frame leaves the closed loop. The R-VLAN tag may have a format similar to the C-Tag defined by 802.1Q.

The VLAN tag value inserted by the E-SPRing node is referred to as the Ring Virtual LAN Identifier (R-VID). The R-VID value denotes the E-SPRing ringlet identifier of the ring. The E-SPRing service class specified by the p-bits (802.1p) 80 and discard eligibility indicator 82 allow multiple service classes to be supported over the ring, and Traffic Management functions to be supported over the ring.

Client frames requesting native transport over the ring are unmodified. Care must be taken when configuring E-SPRing in this operational mode. For example, in order to support ring port blocking, VID filters are applied. Consequently, all data frames on the ring need to be natively VLAN tagged. The Carrier typically does not have control over client (e.g., end customer) traffic. There may also be increased operational procedures required to update ring port blocking information to block a large set of possible client VIDs. When E-SPRing ringlets are used, ring port blocking information is based in the R-VID, and not the potentially large set of client VIDs (e.g., C-VIDs). In addition, a general principle that is often applied on transport entities (e.g., E-SPRing), within a Carrier's network, is that the data used to govern forwarding behavior should be decoupled from the service data. Often, different organizational groups maintain the service and transport data.

E-SPRing Peered Connectivity Mode Overview

When E-SPRing is configured to be in peered mode, the ring may operate either in native mode, in which the client VLAN tag is used to identify traffic on the ring, or in transport mode, in which a ring-specific VLAN tag is inserted into client frames accessing the ring. These two modes will be referred to as peered native mode and peered transport mode. When the E-SPRing is in peered transport mode, then all client frames accessing E-SPRing have a ring specific VLAN tag inserted (denoting the ringlet identifier), with a uniform (configured) R-VID value. Additionally, a designated E-SPRing node will be configured to be a root port. The E-SPRing root port will block all client traffic that is being transported over the ring. When the ring is closed, the root E-SPRing node prevents infinite looping of client data frames.

Figure 8:
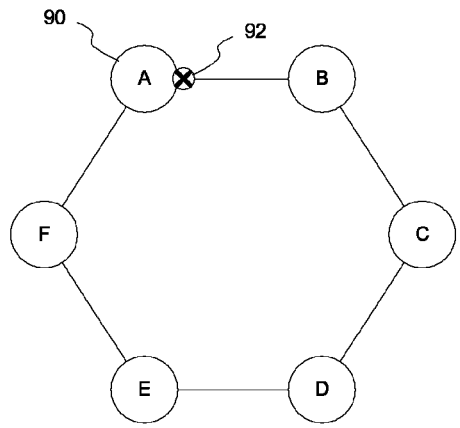
FIG. 8 is a functional block diagram of a closed loop of Ethernet nodes in a closed state with a port block applied at a root node to prevent loops from forming in the Ethernet network.

FIG. 8 shows an example closed loop in which node A has been designated as the root node 90. Other nodes on the ring could equally have been selected as the root node. Every closed loop or ringlet has a designated root node 90, which provides a blocking port 92 of all data traffic over the ring 94. Blocking data traffic prevents the data traffic from looping on the ring. The root node may be manually configured or selected using an auto-selection protocol.

Port blocking on E-SPRing is supported by utilizing port based VID filtering techniques as described in IEEE Std 802.1Q-2005, sections 8.6.2 and 8.6.4. Essentially, E-SPRing frames are discarded (i.e., blocked) if any attempt is made to transmit or received a frame with the designated VID against the port. With this configuration, E-SPRing can provide peered connectivity by utilizing basic nodal IEEE 802.1ad switching behavior. Since all nodes are allowed to talk with all other nodes (peered connectivity) only one R-VID is required per ringlet. The E-SPRing nodes in this configuration need only support IVL (Independent VLAN Learning), as specified by IEEE Std 802.1Q™-2005, section 8.8.7.2. That is, each ringlet VID is associated with a single FDB (Forwarding Data Base) and routes are learned to populate the FDB on a per-R-VID basis.

Figure 9:
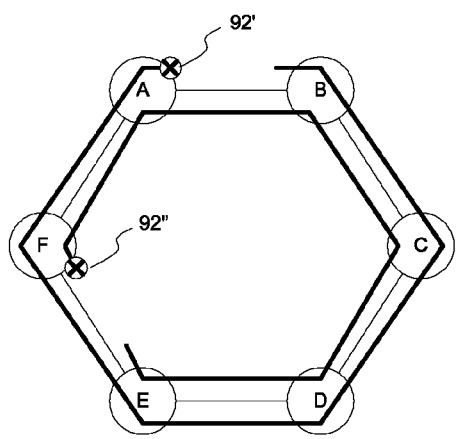
FIG. 9 is a functional block diagram of a closed loop of Ethernet nodes in a closed state with per-ringlet port blocks applied at ringlet root nodes to prevent loops from forming in the Ethernet network.

The E-SPRing architecture allows for multiple ringlets to be supported on the ring. The network operator can optimize the flow of the various clients' traffic over the ring, increase E-SPRing bandwidth and resource utilization, and improve upon overall ring spatial reuse, by applying multiple ringlets, and distributing the placement of the ringlet port blocks. For example, as illustrated in FIG. 9, node A could support a blocking port 92' for ringlet 1, while node E could support another blocking port 92" for ringlet 2. Ringlet 1 blocking port does not impact client traffic being transported by ringlet 2 (and vice-a-versa) because each ringlet is implemented using a separate R-VID, and each of the E-SPRing nodes supports IVL. In this embodiment, although ringlet 1 may not optimally utilize the E-SPRing link between nodes A and B, since there is a blocking port at node A, other ringlets such as ringlet 2 can effectively utilize the E-SPRing link between nodes A and B, since the blocking port is at node E. Thus, by spreading the allocation of blocking nodes, traffic may be allocated effectively on the links on the ring.

E-SPRing Hub 'n Spoke Connectivity Mode Overview

Figure 10:
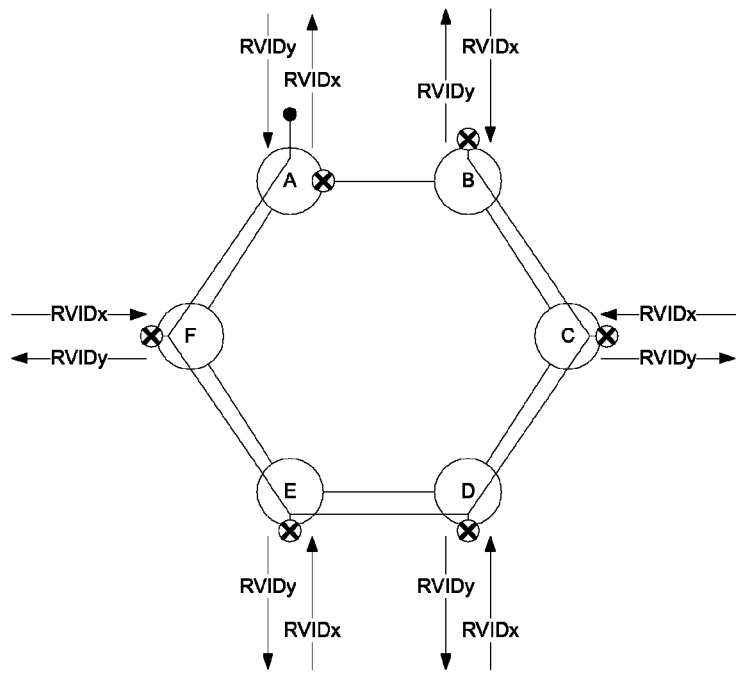
FIG. 10 shows the use of R-VLAN IDs in a hub-and-spoke connectivity mode that enable traffic originated at the hub to be differentiated from traffic originated at one of the spokes.

When E-SPRing is configured to be in Hub and Spoke mode, as shown in FIG. 10, then each E-SPRing node will insert a node specific RVID in all client frames accessing the ring. Specifically, to restrict the spoke nodes so that they only communicate with the hub, different R-VIDs will be used to identify traffic from a spoke from traffic from the hub. Thus, two R-0VID values will be used for each ringlet when implementing hub-and-spoke. Where additional restrictions are desired per ringlet, additional R-VIDs may be used. All E-SPRing Spoke nodes will insert the same unique RVID (e.g., RVIDx) in all client frames accessing the ring. The E-SPRing Hub node will insert a unique RIVD (e.g., RVIDy, where RVIDy≠RVIDx) in all client frames access the ring. E-SPRing Spoke nodes will only process (e.g., remove) E-SPRing data frames from the E-SPRing with an RVID value of the E-SPRing Hub node (e.g. RVIDy). The E-SPRing Hub node will process all E-SPRing data frames with an RVID value identifying any of the E-SPRing Spoke nodes e.g. RVIDx).

In hub-and-spoke connectivity mode, like peered mode, a designated E-SPRing node is configured to be the root node. The E-SPRing root node may be the hub node, but need not be the hub node. In the example shown in FIG. 10, node A is both the hub node and the root node. The E-SPRing root node has a ring port that will block all client traffic that is being transported over the ring. When the ring is closed, the E-SPRing root node 90 prevents infinite looping of client data frames. Port blocking on the E-SPRing is supported by utilizing port based VID filtering techniques as described in IEEE Std 802.1Q-2005. Essentially, E-SPRing frames are discarded (i.e., blocked) if any attempt is made to transmit or received a frame with the designated VID against the port.

With this configuration, E-SPRing can provide Hub and Spoke connectivity by utilizing basic nodal IEEE 802.1ad switching behavior. The application of asymmetric VLANs (as described in IEEE Std 802.1Q-2005, section B.1.3) is utilizes to support the Hub 'n Spoke connectivity model. The E-SPRing nodes in this configuration need only support SVL (Shared VLAN Learning), as specified by IEEE Std 802.1Q-2005, section 8.8.7.2. That is, both the Hub ringlet VID and Spoke ringlet VID is associated with a single FDB (Filter Database). The concept of asymmetric VLANs is described in IEEE Std 802.1Q-2005, section B.1.3. In addition, VID filters 96 are applied at the client port of the E-SPRing Spoke nodes to ensure that client traffic from one Spoke node does not get leaked out any of the other E-SPRing Spoke nodes.

E-SPRing Protection Scheme

E-SPRing does not utilize spanning tree protocol in support of ring protection. When an E-SPRing fault (e.g., ring nodal failure, ring span failure, etc.) is detected, all transported client traffic over the ring affected by the failure is steered at their source away from the failure point. When the affected traffic reaches their final destination nodes, it is switched to its original drop points. This scheme is similar to the MS-SPRing transoceanic application model, and is herein referred to as E-SPRing steering.

The E-SPRing steering protection scheme uses the multiplex section layer indications to trigger the protection switching. Switching actions are performed only on client traffic being transported by the ring affected by the failure. Multiplex section indicators include MS failure conditions, and signaling messages that are sent between nodes to affect a coordinated MS protection switch.

In the event of a failure, ring switches are established at any node whose traffic is affected by the failure. Unlike protection switching techniques that establish loopbacks (i.e., ring folding) at the failure adjacencies to wrap the affected traffic away from the failure over the protection channel, all nodes are allowed to steer the traffic away from the failure point.

Problems that are associated with ring wrapping/folding protection techniques such as misconnection, increased latency (due to longer transmission paths of the protected channel), and overall bandwidth utilization of the ring bandwidth during a failed state, are eliminated by the E-SPRing steering protection switching technique since there are no loopbacks at the switching nodes. In addition, single and multiple failures resulting in ring switching are executed in the same manner, by simply bridging and switching.

Figure 11A:
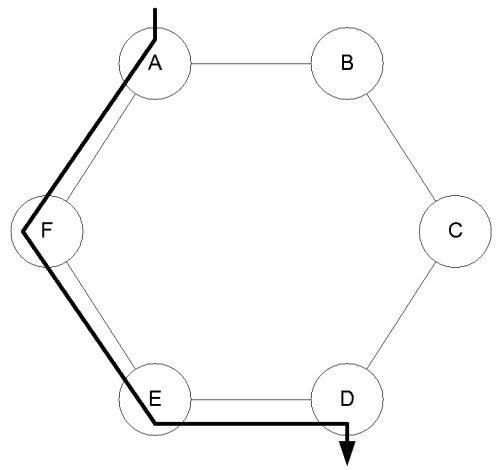
FIGS. 11A and 11B are functional block diagrams of a closed loop of Ethernet nodes show the transmission of a data frame when the loop is in the normal closed state, and in the open state, respectively, and which illustrate the ability of the nodes on the network to support source steering around a failure on the ring.
Figure 11B:
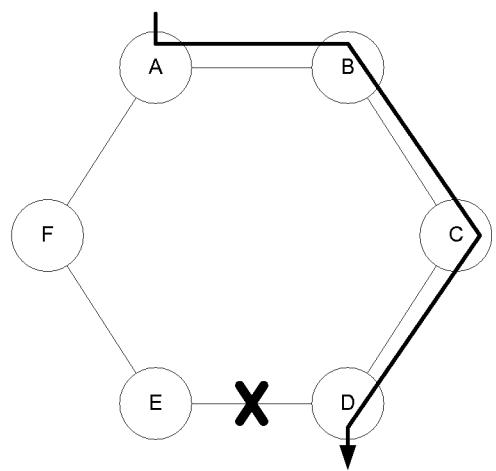

E-SPRing steering is illustrated in FIGS. 11A-11B. In this example, it will be assumed that E-SPRing node A will transmit to node D in the counter-clockwise (west) direction when the ring is in a closed state. However, if a failure occurs that affects the transmission path from node A to node D (e.g., ring span failure between node D and E), then node A will steer traffic around the failure point, by transmitting to node D in the clockwise (east) direction.

E-SPRing Protection Protocol

The basic E-SPRing protection protocol includes three parts, E-SPRing Continuity Validation, E-SPRing Failure Indication, and E-SPRing Recovery Indication. The messages of the E-SPRing protection protocol (Protocol Data Units=PDUs) are contained with the closed loop implementing the E-SPRing. E-SPRing protection protocol PDUs are not leaked out of the ring onto the adjacent networks, nor do they get switched between E-SPRings when a chain of rings is chained together.

E-SPRing Continuity Validation

All E-SPRing ring nodes check the connectivity of links to which they are attached. This may be done in several ways, depending on the particular implementation. For example, the nodes on the network may detect a physical loss of signal and use the physical loss of signal as an indication of a link or adjacent node failure.

Figure 12:
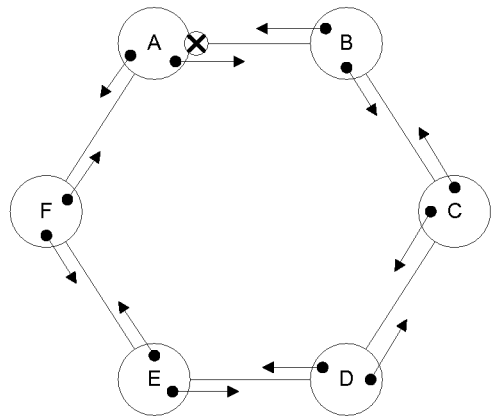
FIG. 12 is a functional block diagram of a closed loop of Ethernet nodes showing the transmission of link-based heartbeat messages to detect connectivity between adjacent nodes.

Alternatively, the nodes on the ring may periodically and persistently transmit ring span segment "heart beat" messages. FIG. 12 shows the transmission of CCM messages between nodes when heartbeat messages are used to determine a loss of connectivity. As shown in FIG. 12, connectivity may be implemented at each node by defining a single Maintenance End Point (MEP) at each ring port regardless of the number of ringlets handled by the node over that port. CCMs may then be persistently transmitted so that a failure to receive CCMs over a particular period of time may be interpreted by adjacent node as a loss of connectivity.

Figure 13:
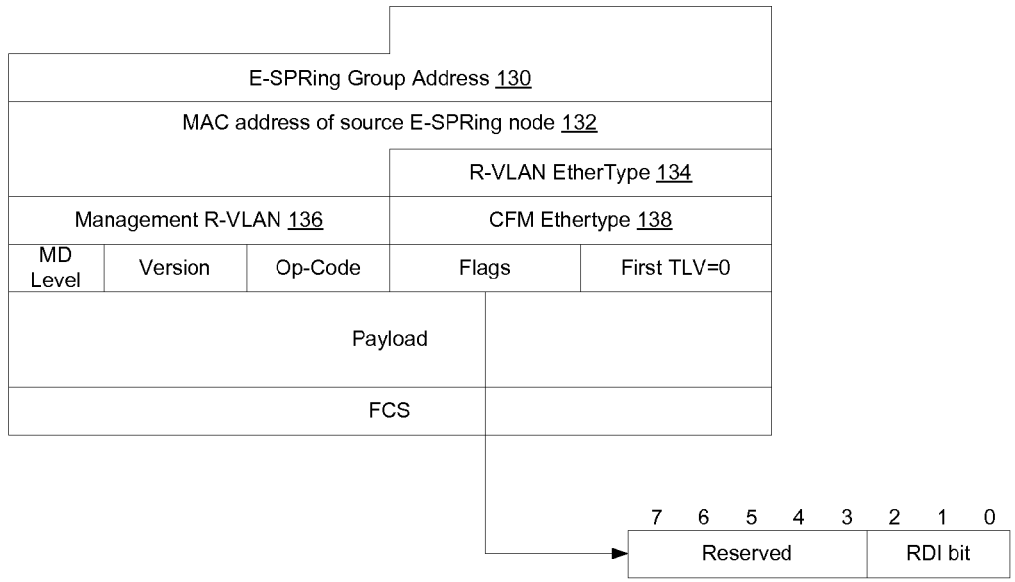
FIG. 13 is a functional block diagram of a management frame that may be used to transmit control information on a set of Ethernet nodes interconnected to form a closed loop.

CCMs may be implemented using of IEEE 802.1ag/ Y.1731 CCMs (Connectivity Check Messages) such as the messages shown in FIG. 13. As shown in FIG. 13, the CCM Message has its destination MAC address set to the E-SPRing group address 130. Since each node on the ring is a member of the E-SPRing group, when a node receives a CCM addressed to the E-SPRing group address it will not forward the message onward but rather will terminate the message. The CCM will also include the source address 132 of the transmitting node.

The CCM message has a CFM Ethertype indicating that it is an Ethernet OAM message. The flags portion of the CCM message may be used to carry the Remote Defect Indicator (RDI) bit, for example when an adjacent node does not receive CCM messages for a particular period of time. The rest of the CCM message is as specified in the IEEE 802.1 ag/Y.1731 specifications.

As shown in FIG. 12, heartbeat messages are persistently sent on both east and west ports of each E-SPRing node. They only travel over a single ring span segment and are terminated by the adjacent E-SPRing node. The heartbeat messages are only sent on links on the ring and never leave the ring.

If an E-SPRing node does not receive an E-SPRing CCM from an adjacent node on a particular link within a configured period of time, it will attempt to dispatch a CCM out that port with the RDI bit set. This behavior is consistent with IEEE 802.1ag/Y.1731 specifications. Ring span or node failures are detected when 3 E-SPRing "heart beat" messages (i.e., CCMs) are not received within 3.5 transmit heartbeat transmit periods, or if an RDI indication is received. Although an embodiment in which a failure to receive three heartbeat messages within 3.5 transmit periods has been described as indicative of a failure, these values may be adjusted based on the frequency of transmission and other operating parameters of the network.

In an alternate embodiment, 802.3 Auto-Negotiation could solely be used to detect a ring span segment failure, when an Ethernet physical layer is used. However such a mechanism can not detect soft failures such as ring node CPU down, etc. Thus, an explicit continuity protocol is preferred, but not mandated.

E-SPRing Failure Indication

If a ring node detects that a ring segment (i.e., ring span or adjacent node) has failed, the ring nodes local to the failure will persistently transmit an E-SPRing Failure Indication Message (FIM) around the ring. The format of the E-SPRing FIM is the same as an ETH CCM, except that the opcode value will be set to indicate that the message is a FIM rather than a heartbeat message. Thus, in one embodiment, the FIM message will be conformant to the transmission specifications described in Y.1731, Section 7.4.1.

E-SPRing FIMs travel over the entire ring and never leave the ring. Downstream E-SPRing nodes (from the node sourcing the ETH-FIM) will have an opportunity to detect the ETH-FIM in transit, and perform nodal actions specified by the E-SPRing state machine. Extensions to Y.1731 need to be made to define the ETH-FIM. A new opcode is proposed, with a value of 52, although another OpCode value may be used depending on the particular value that is assigned for use in connection with the ETH-FIM described herein. ETH-FIM has opcode relevance to both Messaging End Points (MEPs) and Messaging Intermediate Points (MIPs), unlike ETH-AIS and ETH-APS which only have opcode relevance to MEPs.

Figure 14A:
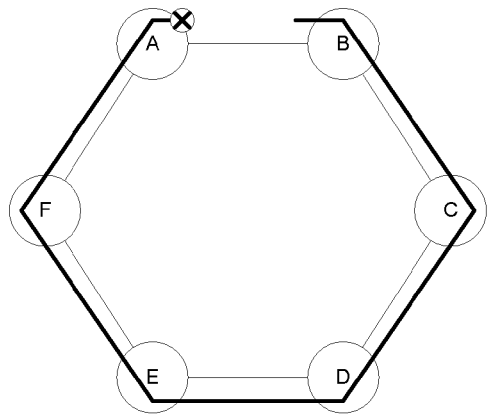
FIGS. 14A and 14B are functional block diagrams of a closed loop of Ethernet nodes showing the normal flow of data when the loop is in the closed state, and when the loop is in the open state, respectively.
Figure 14B:
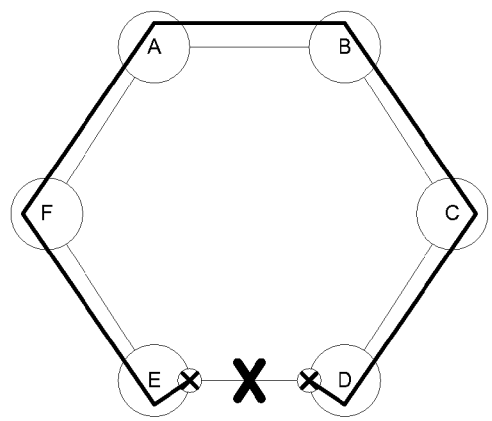

FIG. 14A shows an example set of Ethernet nodes operating in a closed state. As shown in FIG. 14A, in the normal closed state one of the nodes for the ring (or ringlet) will be determined to be the root node and will thus implement a blocking port. When a failure is detected, as shown in FIG. 14B, the nodes adjacent the failure will block the ports to the link and send out failure indication messages. The FIMs will cause the root node to unblock the port so that the data path on the ring extends all the way around the ring.

Each E-SPRing node has ring (east/west) port Maintenance End Points (MEPs) configured. These MEPs are configured at same level (e.g., Level=X). The MEPs are also responsible for Tx/Rx ring span Ethernet Connectivity Check messages (ETH-CC). The MEPs are also responsible for transmitting ETH-FIM/RIM at higher Level (e.g., Level=Y) if link failure detected, in accordance with E-SPRing protection state machine.

Each E-SPRing node has a Maintenance Intermediate Point (MIPs) configured thereon. Each MIP is configured at same level (e.g., Level=Y), which is higher than the MEP level. Processes transit ETH-FIM/RIM messages. That is, each MIP will perform "drop and continue" function, in accordance with E-SPRing state machine.

Figure 15:
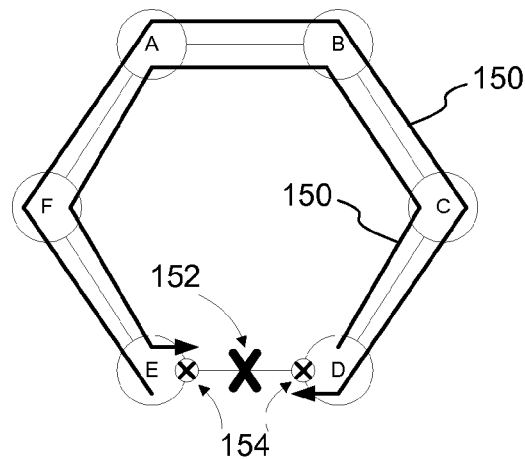
FIG. 15 is a functional block diagram of a closed loop of Ethernet nodes showing the transmission of failure indication messages upon detection of a failure.

FIG. 15 provides an illustration of the FIM transmissions 150 as a result of an E-SPRing failure 152. Upon detection of a failure 152, the E-SPRing node will applying port VID filters 154 on the ports adjacent to the failure point. When an E-SPRing node receives an E-SPRing FIM, the node will flush (i.e., remove) all dynamic entries from its FDB associated with the ring. Flushing the FDBs allows the node to relearn MAC addresses on the ring in view of the new configuration. A failure on the ring may impact all ringlets on the ring. Thus, when the FDB is flushed, the entries for all ringlets are flushed. In another embodiment, when a failure is detected and a protection switching message occurs, only entries associated with a given VID may be flushed from the FDB, or alternatively only selected entries within the VID may be flushed. Thus, depending on the configuration of the ring, different ways of flushing may be optimized to selectively retain information within the FDB that is not affected by the failure on the ring.

Figure 16:
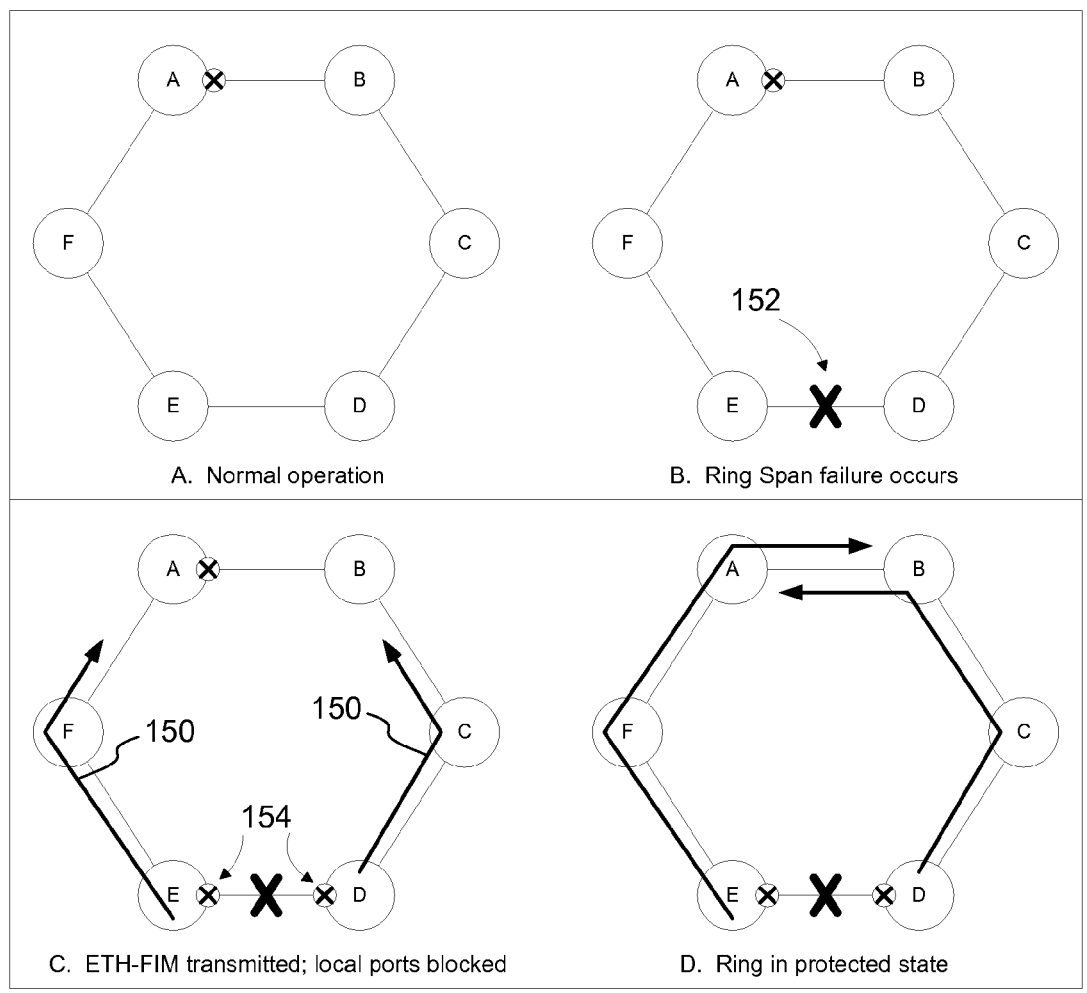
FIG. 16 is a functional block diagram showing how an example closed loop of Ethernet nodes may respond to a span failure.

FIG. 16 shows a series of blocks that illustrate the response to a single failure on the closed loop running the E-SPRing protocol. Block A shows an E-SPRing under normal operations. The node with the root blocking port, in this example, is node A. In block B, a ring span failure occurs between node E and node D. The ring span failure is detected as a result of the Continuity protocol. As shown in block C, the Failure Indication protocol is initiated such that the nodes adjacent the failure persistently transmit ETH-FIMs 152. The ETH-FIMs are sent over the entire ring, using a designated E-SPRing management VID. Block D shows the ring under steady state operation, when the ring is in an OPEN state. As shown in block D, the nodes adjacent the failure add port blocks and the root node removes its port block to allow connectivity on the ring between the nodes adjacent the failure. Adding port blocks by the nodes adjacent the failure prevents a loop from forming when the failure is restored.

The E-SPRing node will also remove all port VID filters, if the ring node is the root node for the ring or one or more ringlets. Removing the port VID filters allows the data traffic to be forwarded around the ring. For example, if the port VID filter was not removed at node A, upon failure between nodes D and E the nodes on one side of the ring could not pass data to the nodes on the other side of the ring. Removal of the port VID filter allows connectivity to extend from one side of the failure around the ring to the other side of the failure. Where multiple ringlets are in use on the closed loop, each ringlet root node will remove the port VID filters for the ringlets when it is the root node. Nodes will also terminate and stop the persistent transmission of the E-SPRing FIMs, if the ring node was the source of the E-SPRing FIM. Additional information of the actions taken by particular nodes on the ring upon receipt of a FIM are set forth below in connection with FIG. 18.

Not all failures on a ring may be bi-directional. For example, as shown in FIG. 29, a failure on the ring may only affect transmission of traffic in one direction. In this instance, only one node adjacent the failure will detect the failure. The node that detects the failure will behave in a normal manner to apply a port block on the link associated with the ring, and transmit a FIM to the other nodes on the ring. The nodes on the ring will behave as described above to flush their FDB and, if the root node, to remove the port block. Optionally, flushing of the FDB and removal of the port block may be directional operations such that a detection of a failure that affects the flow of data only in one direction around the ring will only cause nodes to flush FDB entries that may be affected by that failure.

E-SPRing Recovery Indication

If a ring node detects that a ring segment (i.e., ring span or adjacent node) has recovered, the ring nodes local to the recovery segment will persistently transmit an E-SPRing ringlet Recovery Indication Message (RIM) around the ring, to inform the other ring nodes to revert to the original state. The format of the E-SPRing RIM is similar to the E-SPRing FIM described above, except that it has a different OpCode, i.e. OpCode=53. Other op-codes may be used as well depending on the particular implementation. The FIM, in one embodiment, conforms to the transmission specifications described in Y.1731, Section 7.4.1.

Forwarding to E-SPRing control frames such as ETH-FIM or ETH-RIM messages (using management R-VID), in one embodiment, are not performed using a control plane. Rather, they are forwarded by the data plane using the bridge relay. The E-SPRing RIM messages travel over the entire ring but never leave the ring. Downstream E-SPRing nodes (nodes downstream from the node sourcing the ETH-RIM) will have an opportunity to detect the ETH-RIM in transit, and perform nodal actions specified by the E-SPRing state machine. Extensions to Y.1731 are needed to define the ETH-RIM message. A new opcode is proposed, with a value of 53, although other opcode values could be used instead. ETH-RIM, like ETH-FIM, has an opcode relevance of MEPs and MIPs, unlike ETH-AIS and ETH-APS which only has an opcode relevance of MEPs.

When an E-SPRing node receives an E-SPRing RIM, the node will flush (i.e., remove) all dynamic entries from its FDB. This allows the node to re-learn reachability information on the network based on the new network topography. If the ring node is the root, it will also re-add port VID filters. If the ring node is the source of the message, the node will also remove its port VID filters that were added because of the failure, and terminate the persistent transmission of the E-SPRing RIM.

Upon recovery, the E-SPRing nodes will not remove BLOCK ports until a configurable period of time. This will compensate for any race conditions that may occur with the root node enabling the BLOCKing on the root port. Alternatively, the nodes adjacent the failure may not remove the port VID filters until receipt of a confirmation message from the root node that the port VID filter has been added by the root node.

Figure 17:
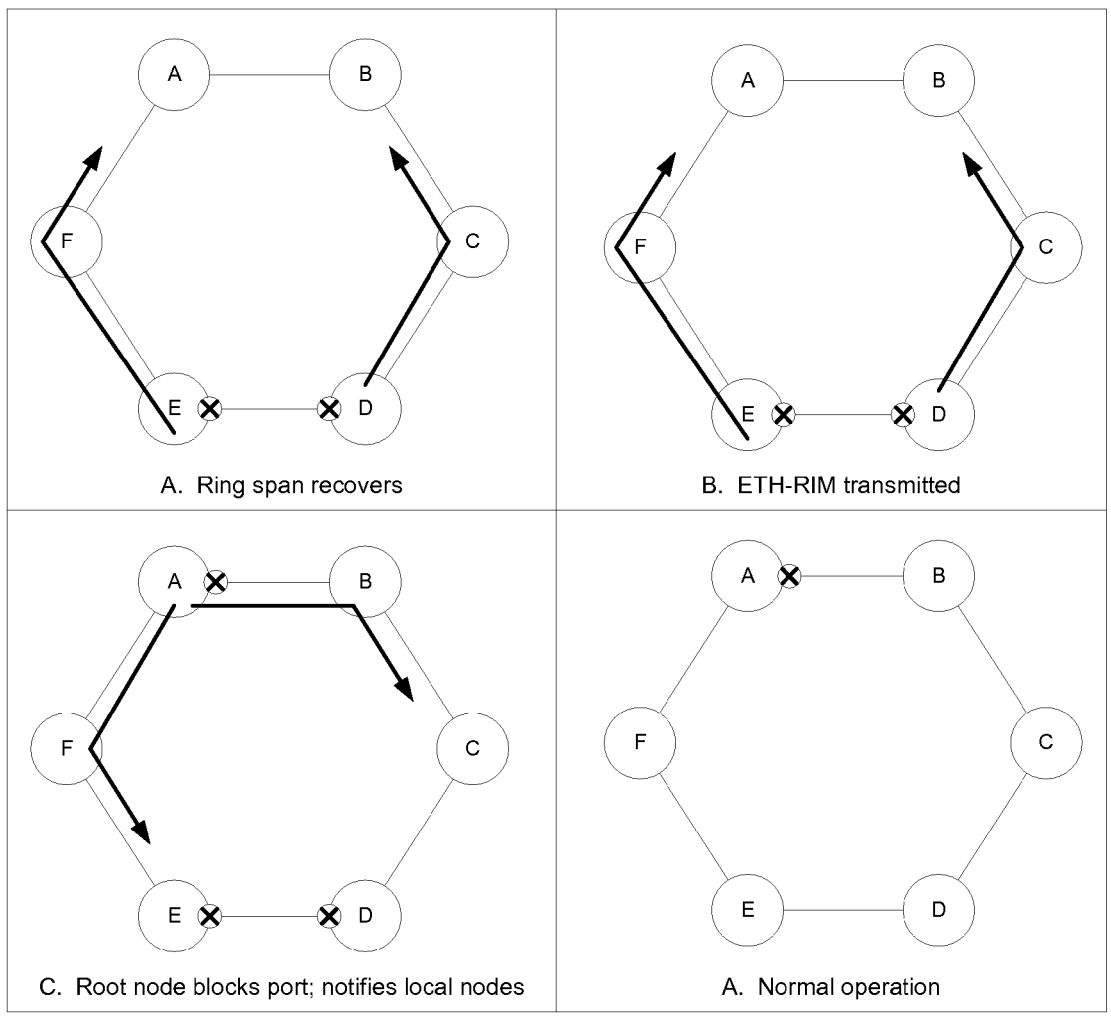
FIG. 17 is a functional block diagram showing how an example closed loop of Ethernet nodes may respond to a span recovery.

The sequence of events that occur when the ring span recovers is illustrated in FIG. 17, which shows the recovery of the previously failed ring span between node D and node E. The ring span recovery is detected as a result of the Continuity Check protocol. As shown in block A, the Recovery Indication protocol is initiated and ETH-RIMs are persistently dispatched by E-SPRing nodes local to the recovery point (as specified by Y.1731, section 7.4.1) block B. These ETH-RIMs are sent over the entire ring, using a designated E-SPRing management VID. As shown in block C, when an E-SPRing node that owns the root port receives an ETH-RIM, it will re-add a block to the client data traffic port. Optionally, the root port may also transmit a message back to the nodes adjacent the recently recovered failure to indicate when the data port has been blocked. The ETH-RIMs are terminated by the E-SPRing nodes that transmitted them. Subsequently, as shown in block D, the ring will return to normal steady state operation, when the ring is back in a normal CLOSED state.

E-SPRing Protection State Machine

The E-SPRing nodes, links, ports, and rings have states associated with them. An example state machine that may be implemented will now be described in connection with FIG. 18. The E-SPRing nodal link states are defined as follows:

LOC (Loss of Continuity)—This state is detected by the E-SPRing port MEPs and is entered when a designated number of CCMs (e.g., 3 CCMs) are not received during a particular duration. The duration may be a set period of time or based on the normal time between transmission of successive CCMs. This state can also be entered when an E-SPRing port MEP receives a CCM with the RDI bit set. An E-SPRing port MEP transmits a CCM with the RDI bit set when it does not receive a designated number of CCMS within a pre-configured duration.

SF (Signal Fail)—Detected when the E-SPRing physical ring port is Out Of Service (OOS). This can occur due to a physical link failure or as a result of the operator's manual intervention by placing the link in OOS-MA.

SD (Signal Degrade).

OK—The E-SPRing physical port is In Service (IS) and operational. This is the normal state of the E-SPRing nodal link.

The E-SPRing nodal port states are defined as follows:

BLOCK—E-SPRing logical port state. Indicates when R-VID filtering is applied against a particular physical E-SPRing link.

UNBLOCK—E-SPRing logical port state. Indicates when R-VID filtering is not applied (i.e., removed) against a particular physical E-SPRing link.

Only data ringlets (i.e., ringlets denoted by an RIVD carrying client traffic being transported over the ring) are blocked by a port BLOCK. The E-SPRing management ringlet (denoted by the management RIVD) is not blocked by the port BLOCK.

The E-SPRing nodal states are defined as follows:

NORMAL—Indicates that the node perceives the E-SPRing to be in a CLOSED state.

PROTECT—Indicates that the node perceives the E-SPRing to be in an OPEN state.

PENDING—Indicates that the node is attempting to CLOSE the E-SPRing.

The E-SPRing ring states are defined as follows:

OPEN—The E-SPRing is broken as a result of a ring span or ring node failure.

CLOSED—Normal operation of the E-SPRing.

The state machine tables governing the E-SPRing protection protocol are illustrated in FIG. 18. All E-SPRing nodes share this common state machine. The first three columns indicate the current disposition of the E-SPRing node. This includes the node, link, and port state. The event that triggers a state transition are indicated by the forth and fifth columns. This includes the new link state, and the reception of an E-SPRing control message such as an ETH-FIM or ETH-RIM. The resulting new node state and action performed by the node are indicated by the sixth and seventh columns.

The E-SPRing state transition table should be read in descending order to determine the correct action to take. For example, at Row 8, the current E-SPRing states are: (node state=NORMAL), (link state=OK), and (port state=UNBLOCK). The event is: (new link state=OK) and (received message=ETH-FIM). The result is: (action=flush FDB), (new node state=PROTECT).

At Row 9, the current E-SPRing states are: (node state=NORMAL), (link state=OK), and (port state=UNBLOCK). The event is: (new link state=OK) and (received message=ETH-RIM). The result is: (action=flush FDB), (new node state=NORMAL).

At Row 10, the current E-SPRing states are: (node state=NORMAL), (link state=OK), and (port state=UNBLOCK). The event is: (new link state=OK) and (received message=message other than ETH-FIM/RIM). The result is: (new node state=NORMAL).

Additionally, at Row 7, the current E-SPRing states are: (node state=NORMAL), (link state=OK), and (port state=UNBLOCK). The event is: (new link state=LOC) and (received message="don't care"). The result is: (action=put port in BLOCK state, flush FDB, and transmit ETH-FIM), (new node state=PROTECT).

For example, at Row 12, the current E-SPRing states are: (node state=PROTECT), (link state=LOC), and (port state="don't care"). The event is: (new link state=OK) and (received message="don't care"). The result is: (action=transmit ETH-RIM), (new node state=PENDING).

For example, at Row 26, the current E-SPRing states are: (node state=PENDING), (link state=OK), and (port state=BLOCK). The event is: (new link state=OK) and (received message=MY ETH-RIM). MY ETH-RIM, as used herein, will be used to refer to an ETH-RIM message that is received by the E-SPRing node that transmitted the message. Similarly, MY ETH FIM, as used herein, will be used to refer to an ETH FIM message that was received by the E-SPRing node that transmitted the message. The result is: (action=UNBLOCK port if not root, flush FDB, and stop persistent transmissions of ETH-RIM), (new node state=NORMAL).

To avoid learning the destination from client frames transport over the ring that are currently queued at an E-SPRing node before an E-SPRing protection switching event occurs, the learning process on the link are disabled for a configurable period of time after performing a flush FDB operation.

Race conditions may occur, where (lower priority) client traffic, traveling on the ring span, is received by an E-SPRing node before a ring control frame (e.g., ETH-FIM/RIM). However, since the ring control frame may be of a higher priority, it will be queued at the E-SPRing node in a higher priority queue, which could result in the ring control frame passing the client frame (being transported over the ring). To ensure that spurious FDB learning does not occur after an FDB flush (as a result of reception of a ETH-FIM/RIM), the learning process should be disabled for a configurable period of time, after the flush FDB operation occurs Multiple Ring Failure Scenario Operation of the ring under multiple failures is similar to operation of the ring in a single failure scenario. Consider an E-SPRing (in Peered mode) that experiences a multiple ring span failures. Assume the first failure follows the sequence illustrated in FIG. 16. Now, assume a second failure occurs. The second ring span failure, in this instance, will be detected as a result of the Continuity protocol being run across that span. Nodes adjacent the failure will transmit ETH-FIMs around the ring, which will cause the nodes that are able to receive such FIMs to flush their FDB. Since the root node will have already removed it data port block, no additional removal of a data port block is necessary.

As spans recover, the nodes adjacent the span will detect the recovery and transmit ETH-RIM messages. Any spans that have not recovered will continue to transmit ETH-FIM messages. Thus, the nodes on the ring will flush their FDB and recover sequentially from the multiple failures as those failures are restored on the network. By causing the nodes adjacent a failure to persistently transmit FIMs, recovery of one node will not cause the node to go to normal state until all failures have recovered.

E-SPRing Interconnect

Figure 19:
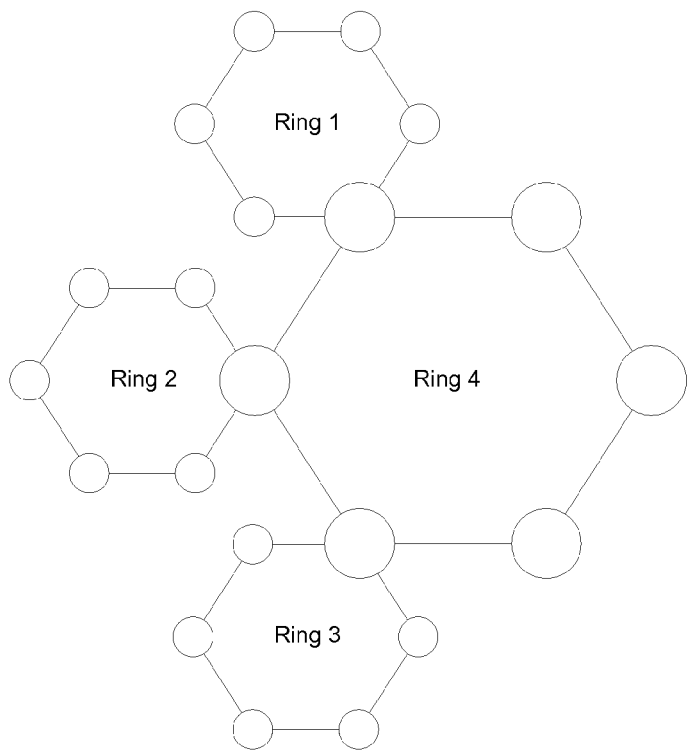
FIG. 19 is a functional block diagram showing several closed loops of Ethernet nodes interconnected.

E-SPRing supports multiple interconnection configurations. This allows E-SPRing to be used in network applications where rings can be chained to form network or sub-network wide segments providing client traffic transport of point-to-point or multipoint connectivity, while still retaining sub-50 ms protection. An example network reference of the inter-connection of E-SPRings is illustrated in FIG. 19. Applications ranging from wireless backhaul to business services can take advantage of E-SPRing interconnect, although other applications may use it as well.

Figure 20A:
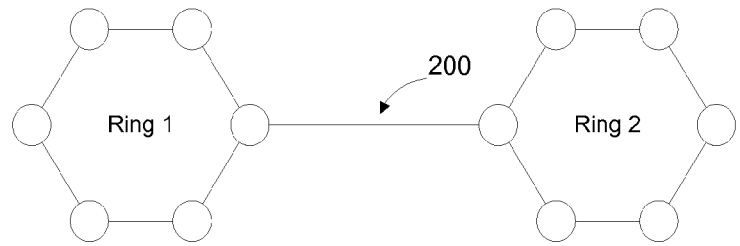
FIGS. 20A-20C are functional block diagrams showing several ways of interconnecting closed loops of Ethernet nodes.
Figure 20B:
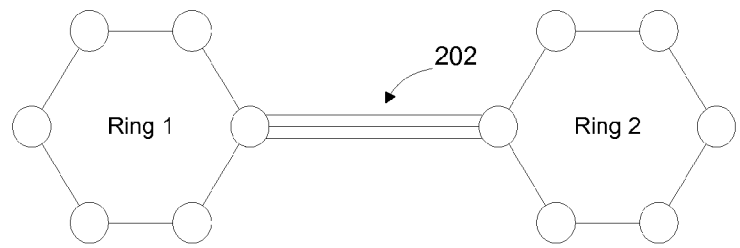
Figure 20C:
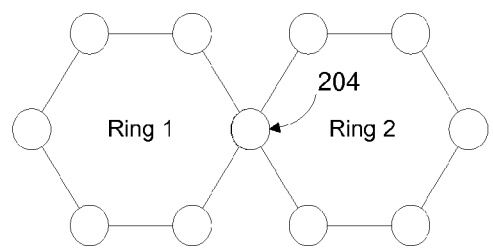

E-SPRing supports multiple methods of interconnecting rings. For example, as shown in FIGS. 20A-20C, a pair of E-SPRings may be interconnected via a single link 190 (FIG. 20A), via a link aggregation group 192 (FIG. 20B), or directly (FIG. 20C). When the rings are connected via a single link or single node, the interconnection scheme is susceptible to a single point of failure. That is, if the interconnection link 190, 192, or interconnection node fails, then ring interconnect is prevented.

E-SPRing interconnect via an Ethernet LAG is illustrated in FIG. 19B. This scheme does support a level of link interconnect protection (by utilization of the link aggregation protocol), however there is no E-SPRing nodal (i.e., equipment) protection subtending the ring interconnect link aggregation group 192.

E-SPRing direct interconnect via an E-SPRing node is illustrated in FIG. 19C. The node 194 providing interconnection between E-SPRing1 and E-SPRing2, switch inter-ring (as well as intra-ring) traffic. A disadvantage of this scheme is that there is no E-SPRing nodal (i.e., equipment) protection providing connection to the rings.

Figure 21:
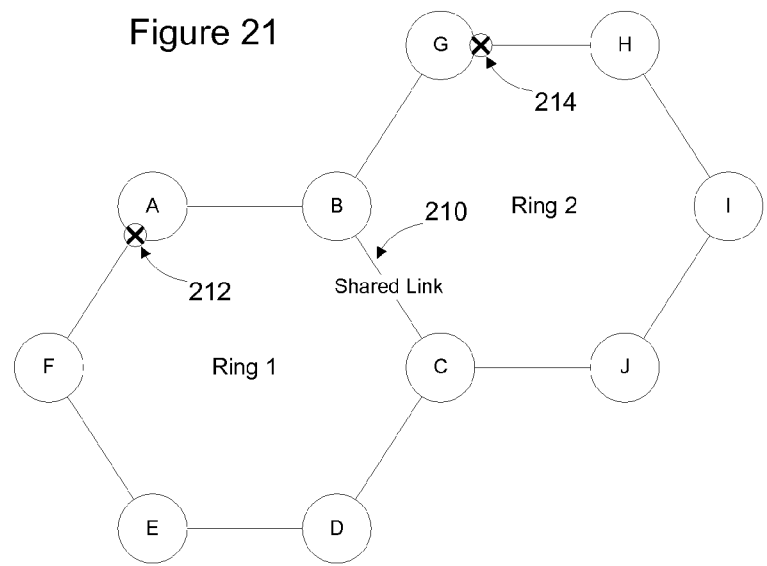
FIG. 21 is a functional block diagram showing the interconnection of two closed loops of Ethernet nodes using a shared link and two shared nodes.

E-SPRing interconnect via a shared link is illustrated in FIG. 21. This scheme provides nodal and link protection between interconnected E-SPRings. E-SPRing nodes that participate in a shared link run an E-SPRing Shared Link Protocol (SLP) protocol between each other to determine if the E-SPRing node attached to the shared link 210 should block inter-ring traffic. The E-SPRing inter-ring blocking only applies to inter-ring traffic and not intra-ring traffic. In addition, E-SPRing SLP does not affect the E-SPRing intra-ring protection protocols described above.

The E-SPRing SLP is designed not only to support ring interconnection, but also to support the desired optimal traffic flows for ring interconnect during multiple failure scenarios. Under normal shared link E-SPRing interconnect, the ring blocking is illustrated in FIG. 21. In this example, E-SPRing1 has designated node A to contain the client data port block 212 and E-SPRing2 has designated node G to contain the client data port block 214. The E-SPRing SLP is run between nodes E and F, resulting in not blocking of inter-ring client traffic.

Figure 22:
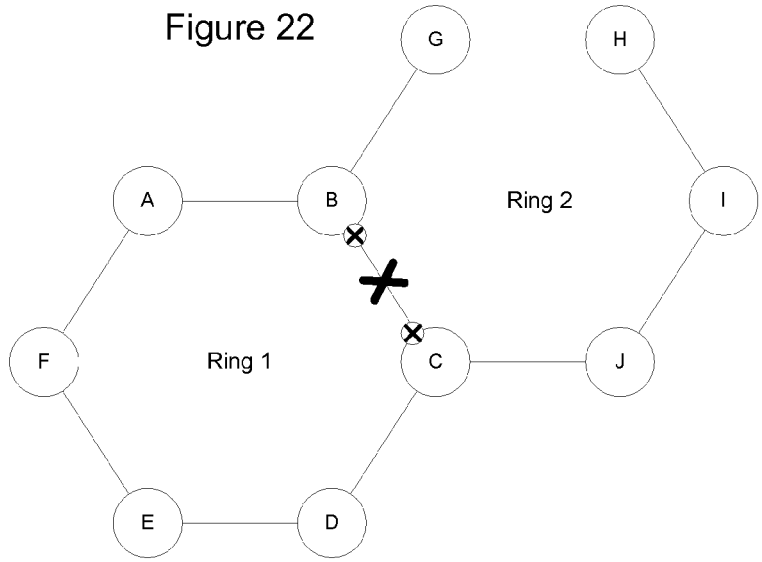
FIG. 22 is a functional block diagram showing the interconnection of two closed loops of Ethernet nodes when a failure occurs on a shared link.

If a failure occurs on the shared link 210, then as a result of the Continuity and Failure Indication protocols described above run on each E-SPRing, the blocked ports 212, 214 on each ring root port will be removed. An intra-ring block will also be established on each ring at nodes E and F. Inter-ring blocking supported by SLP at node E is activated. This is illustrated in FIG. 22.

The benefit of this resulting configuration is important. Assume E-SPRing1 represents an Access ring, and E-SPRing2 represents a large Metro/Collector ring. The configuration shown in FIG. 22, will result in maintaining local E-SPRing1 Access traffic within in E-SPRing1, and will cause the local Metro/Collector traffic to remain within E-SPRing2, at steady state. In this example, it would be advantageous to have the rings set up such that resulting re-configurations which occur during failures should be such that local Access traffic need not persistently travel over the Metro/Collector ring to get to the local Access sink point. Conversely, the large amount of aggregated Metro/Collector traffic should not persistently travel over any individual Access ring.

Figure 23:
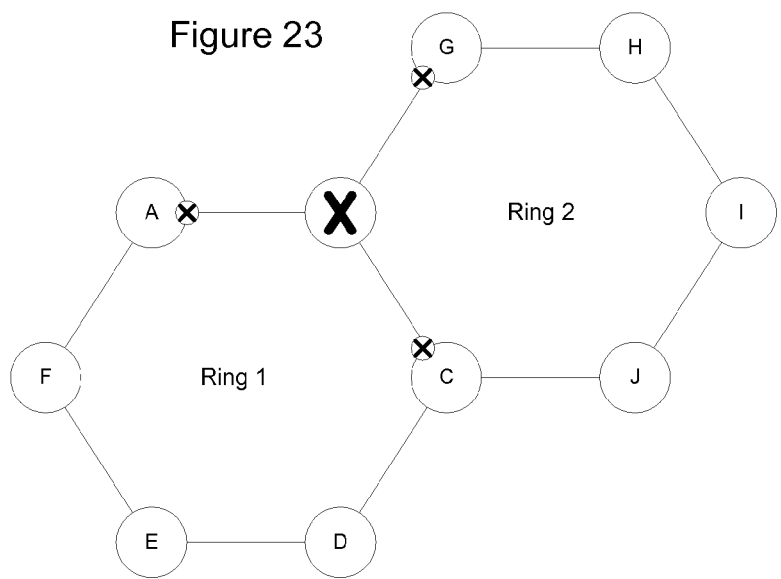
FIG. 23 is a functional block diagram showing the interconnection of two closed loops of Ethernet nodes when a failure occurs on a node interconnecting the two closed loops.

Another failure scenario that the E-SPRing shared link configuration needs to support is illustrated in FIG. 23. As shown in FIG. 23, if a node failure occurs at one of the nodes implementing the shared link, the failure will be detected by the adjacent nodes. Thus, for example, if node B, adjacent nodes A, C, and G will send out FIMs. Nodes A and C will transmit a FIM on ring 1, and nodes G and C will transmit a FIM on ring 2. The nodes will also apply port blocks to isolate the failure for intra-ring traffic, but the E-SPRing SLP will not introduce any inter-ring blocking function. Once again, as shown in FIG. 23, the end result is that E-SPRing1 access traffic will remain in E-SPRing1, and the Metro/Collector traffic to remain in E-SPRing2, at steady state.

Figure 24:
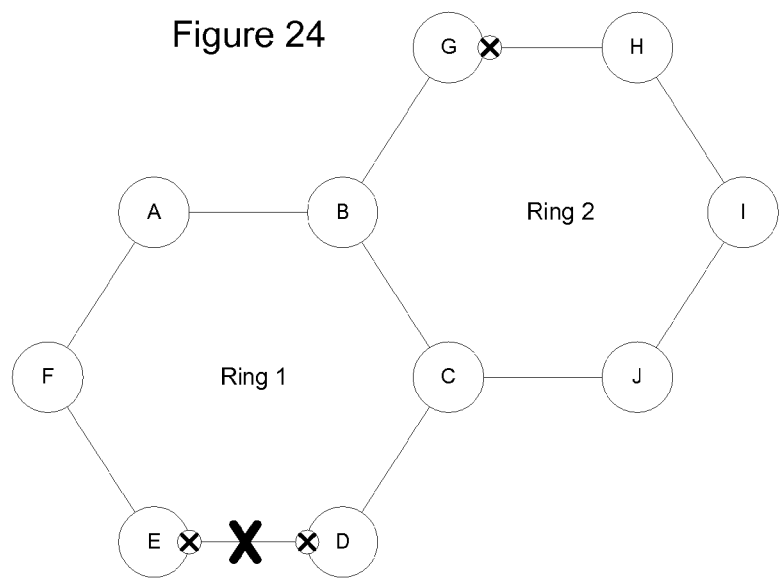
FIG. 24 is a functional block diagram showing the interconnection of two closed loops of Ethernet nodes when a failure occurs on one of the two closed loops.

Another failure scenario that the E-SPRing shared link configuration needs to support is illustrated in FIG. 24. If a failure occurs on a non-shared link (e.g., between E-SPRing1 node D and node E), then as a result of the Continuity and Failure Indication protocols described above run on E-SPRing1, the block ports on the ring root port on that ring will be removed and data blocks will be established on the ring adjacent the failure. However, no inter-ring blocking supported by SLP is introduced.

The E-SPRing SLP supports multiple failures for E-SPRing interconnections utilizing shared links. In the event of shared link failure and an E-SPRing failure, inter-ring connectivity can still be achieved. E-SPRing SLP maintains connectivity during single and optionally multiple failure scenarios.

Figure 25:
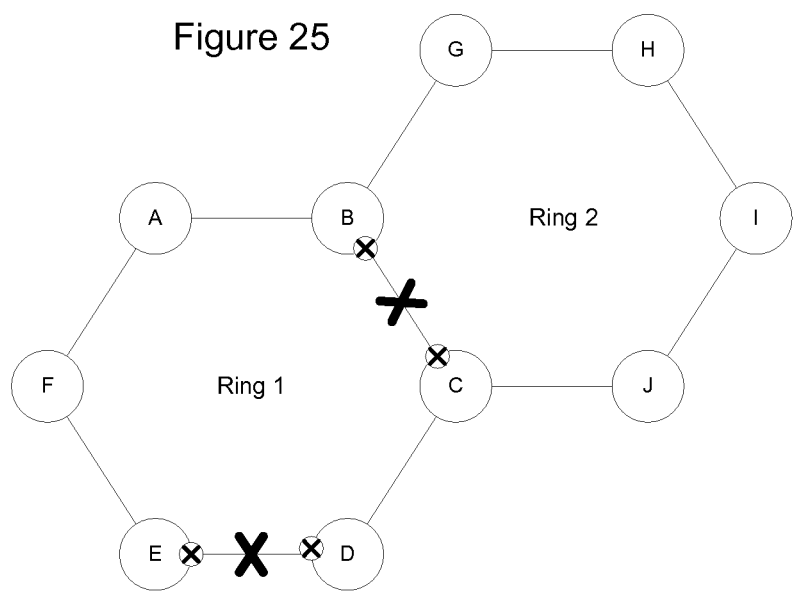
FIG. 25 is a functional block diagram showing the interconnection of two closed loops of Ethernet nodes with multiple failures.

For example, consider a dual failure scenario depicted in FIG. 25, in which a first failure has occurred on the shared link (between node E and node F), and a second failure has occurred on E-SPRing1 link between nodes C and D. In this scenario, full connectivity between all nodes on the two rings is still achievable. E-SPRing1 Continuity and Failure Indication protocols described above will remove the root port block from E-SPRing1 node A, and add port blocks adjacent to the node C and node D failure points. The E-SPRing2 Continuity and Failure Indication protocols will remove the root port block from E-SPRing2 node G, and add port blocks adjacent to the node E and node F failure points. The E-SPRing SLP will not introduce any inter-ring blocking Full connectivity between all nodes on E-SPRing1 and E-SPRing2 is thus possible.

In the above-described example, the two rings were shown as being interconnected by a shared link that extended directly between a pair of nodes on the two rings. There may be other scenarios, such as the example shown in FIG. 27, where the link is virtual and spans an intermediate node C. For example, in the example shown in FIG. 27, ring 1 is defined by nodes [A, B, C, D, E, F, A], and ring 2 is defined by nodes [B, G, H, I, J, K, D, C, B]. As is clear in this picture, the shared link is a logical link between subtending nodes D and B, which spans intermediate node C. The link thus may be physical, and span directly between a pair of adjacent nodes on the two rings, or may be logical and include a separate sub-net connection between the subtending nodes B and D.

FIG. 28 shows another interconnection possibility in which Ring 1, defined by nodes [A, B, C, D, E, F, A] is interconnected with Ring 2, defined by nodes [B, G, H, I, J, K, D, C, B] via a third ring [B, C, D, L]. In this instance, logical link between nodes B and D-link [B, C, D], would form a logical link between the first ring and the second ring, and also between the second ring and the third ring. Thus, a given physical link or logical link may be used by more than one pair of rings.

E-SPRing Shared Link Protocol (SLP)

The E-SPRing SLP determines whether E-SPRing nodes attached to the shared link should block inter-ring traffic or not. Each E-SPRing node (subtending the shared link) will be a member of an E-SPRing unique SLP group. Each E-spring node subtending the shared link will also periodically transmit SLP messages (which include a SLP group identifier), out each ring port, for each E-SPRing. The subtending nodes remove received SLP message(s) from the ring, if the E-SPRing node belongs to the SLP group designated by the SLP message.

One of the subtending nodes will be responsible for blocking inter-ring client data traffic when the node is in the reachable SLP state, but the E-SPRing shared link is down (i.e. the nodal link state is Loss of Connection, Signal Failure or Signal Degrade). Otherwise, no inter-ring blocking is applied by the designated subtending node. A subtending node may be reachable where the shared link is down, since the SLP messages may be transmitted to the subtending node in the other direction around the ring. Thus, reachability may still be possible between the nodes subtending the shared link, even when the shared link is experiencing failure.

In event of an E-SPRing SLP nodal failure, reachability is no longer possible. In the event of a dual failure, where the shared link experiences a failure and one of the E-SPRings experience a failure then reachability is no longer possible. In this case, the E-SPRing SLP peer nodes don't receive SLP messages on one of the E-SPRings.

The format of the SLP message will be in the form of IEEE 802.1ag/Y.1731 CFM CCMs, (with an E-SPRing management VID inserted). The E-SPRing SLP Reserved Group address will be of a form 01-xx-xx-xx-xx-yy, where yy denotes the shared link group.

Each SPL node will implement a state machine governing the state of the shared link. The E-SPRing SLP state machine will govern whether the peer node is reachable over the shared link or unreachable. If a peer node does not receive a connectivity check message within a period of time, it will determine that the shared link is down and that the other node is unreachable.

Consequently, the designated (via configuration) E-SPRing node participating in SLP will perform inter-ring blocking if it is in a REACHABLE SLP state, and the E-SPRing shared link is down (i.e., nodal link state is LOC, SF, SD). Otherwise, no inter-ring blocking is applied.

Figure 26:
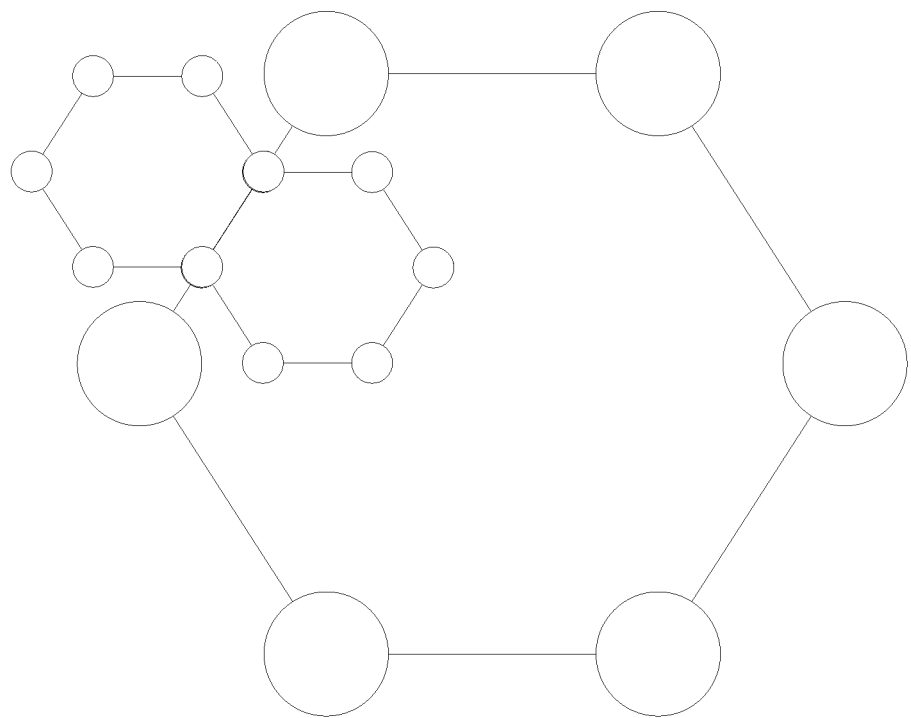
FIG. 26 is a functional block diagram showing the interconnection of multiple closed loops of Ethernet nodes using a common shared link.

The E-SPRing SLP is also designed to accommodate a given E-SPRing supporting multiple shared links. Where an E-SPRing supports two shared links, each shared link will be identified by a unique SLP group identifier. The SLP group identifier is encoded in the destination group address of the SLP message. E-SPRing SLP can even support more complex shared links configurations where a shared link 260 is a part of multiple E-SPRings. This is illustrated in FIG. 26.

The functions described above may be implemented as a set of program instructions that are stored in a computer readable memory and executed on one or more processors on the computer platform. However, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, a state machine, or any other device including any combination thereof. Programmable logic can be fixed temporarily or permanently in a tangible medium such as a read-only memory chip, a computer memory, a disk, or other storage medium. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method for controlling a plurality of Ethernet nodes interconnected by links to form a closed loop, the closed loop including a root node having a data port block applied to prevent all data traffic from flowing through said block, the method comprising the steps of:
    detecting, by each Ethernet node, an operational status of the links on the closed loop to which the corresponding Ethernet node attaches;
    upon detection of a failure of a link:
        transmitting, by an Ethernet node adjacent to the failure, an Ethernet Failure Indication Message (FIM) to all Ethernet nodes;
        upon receipt of an Ethernet FIM by said root node, unblocking the data port block to allow data traffic to traverse that port; and
        upon receiving the Ethernet FIM at each Ethernet node, each Ethernet node at least partially flushing a forwarding database (FDB) such that traffic is steered by each node to traverse the closed loop in a direction away from the failed link upon receipt of said Ethernet FIM.

2. The method of claim 1, wherein the FIM is an Ethernet OAM format message, the method further comprising determining, by each Ethernet node that received the FIM, whether the FIM triggers a state transition on the Ethernet node that received the FIM.

3. The method of claim 1, wherein the step of detecting the operation status is performed using link-level Ethernet Connectivity Check Messages (CCMs).

4. The method of claim 3, wherein the link level Ethernet CCMs are terminated by adjacent nodes.

5. The method of claim 3, wherein each node maintains an Ethernet Messaging End Point (MEP) to implement a maintenance entity across the link using the link-level Ethernet CCMs.

6. The method of claim 5, wherein one maintenance entity is implemented by each node for each port that is connected to a link on the closed loop.

7. The method of claim 1, wherein data traffic that enters the ring is not encapsulated to thus be transported in native format on the ring.

8. The method of claim 1, wherein data traffic is assigned a Ring Virtual Local Area Network Identifier (R-VLAN ID) upon entering the closed loop.

9. The method of claim 8, wherein different R-VLAN IDs are assigned to different traffic entering the closed loop enabling multiple ringlets to exist on one closed loop.

10. The method of claim 8, wherein all traffic entering the closed loop is assigned the same R-VLAN ID to enable peered connectivity between the nodes on the closed loop.

11. The method of claim 8, wherein a first R-VLAN IDs is assigned to traffic entering the closed loop at a hub node and a second R-VLAN ID is assigned to traffic entering the closed loop at spoke nodes enabling the network to implement hub-and-spoke connectivity.

12. The method of claim 1, wherein the set of Ethernet nodes are selected from a mesh network of Ethernet nodes to form a logical ring within the mesh network of Ethernet nodes.

13. The method of claim 12, wherein traffic on the logical ring is assigned a Ring Virtual Local Area Network Identifier (R-VLAN ID) enabling traffic on the ring to be distinguished from traffic on the mesh network.

14. The method of claim 12, wherein the control protocol used to control traffic on the ring is decoupled from a control protocol used to control traffic on the mesh network.

15. The method of claim 1, wherein the step of at least partially flushing the FDBs allows nodes to relearn forwarding entries associated with services on the network to thus allow protection switching of the services to occur if necessary in view of the failure.

16. The method of claim 15, wherein data traffic is switched to protection, if necessary based on the failure, at the node where the traffic enters the closed loop.

17. The method of claim 16, wherein protection switching allows sub 50-ms service restoration.

18. The method of claim 1, wherein the control protocol is agnostic as to the underlying transport protocol in use on the network.

19. The method of claim 1, wherein the nodes on the network each have a Forwarding Data Base, and wherein routes are learned by the nodes on the closed loop and used to populate the FDB with forwarding entries.

20. The method of claim 1, further comprising the step of applying data port blocks by the nodes adjacent the failure to isolate the failure and prevent data traffic from traversing the portion of the closed loop affected by the failure upon recovery from the failure.

21. The method of claim 20, wherein the data port blocks are applied by the nodes adjacent the failure prior to recovery from the failure.

22. A method for controlling a plurality of Ethernet nodes interconnected by links to form a closed loop, the closed loop including a root node having a data port block applied to prevent all data traffic from flowing through said block, the method comprising the steps of:
    detecting, by each Ethernet node, an operational status of the links on the closed loop to which the corresponding Ethernet node attaches;
    upon detection of a failure, transmitting by each Ethernet node adjacent to the failure an Ethernet Failure Indication Message (FIM) to all Ethernet nodes in the closed loop;
    upon receipt of said Ethernet FIM by said root node, said root node removing said data port block thus allowing data traffic to flow through said port; and
    upon receipt of said Ethernet FIM by each Ethernet node, at least partially flushing a forwarding database (FDB) containing entries related to the data traffic on the links implementing the closed loop thus steering, by each Ethernet node that received the Ethernet FIM, the data traffic affected by the failed link away from the failed link.

23. The method of claim 22, wherein said steering upon receiving said FIM by each node comprises flushing by each Ethernet node, a FDB containing entries related to data traffic on the links implementing the closed loop.

24. The method of claim 23, wherein the step of flushing the FDB allows nodes to relearn forwarding entries associated with services on the network to thus allow protection switching of the services to occur if necessary in view of the failure.

25. The method of claim 22, further comprising, upon detection of the failure and prior to recovery from the failure, applying data port blocks by the nodes adjacent the failure to isolate the failure and prevent data traffic from traversing the portion of the closed loop affected by the failure upon recovery from the failure.

* * * * *